VERNON G. BURNELL
INVENTOR.

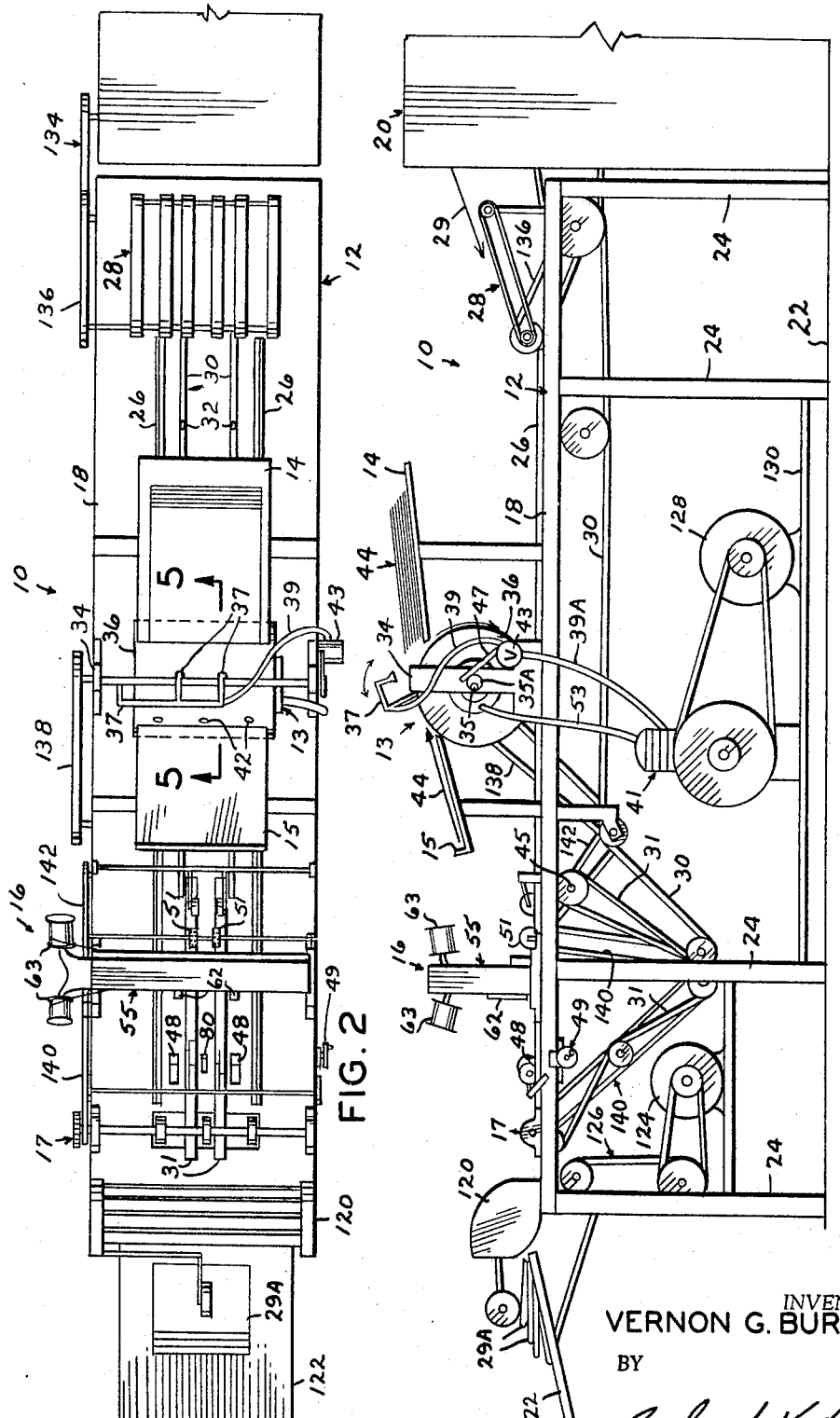

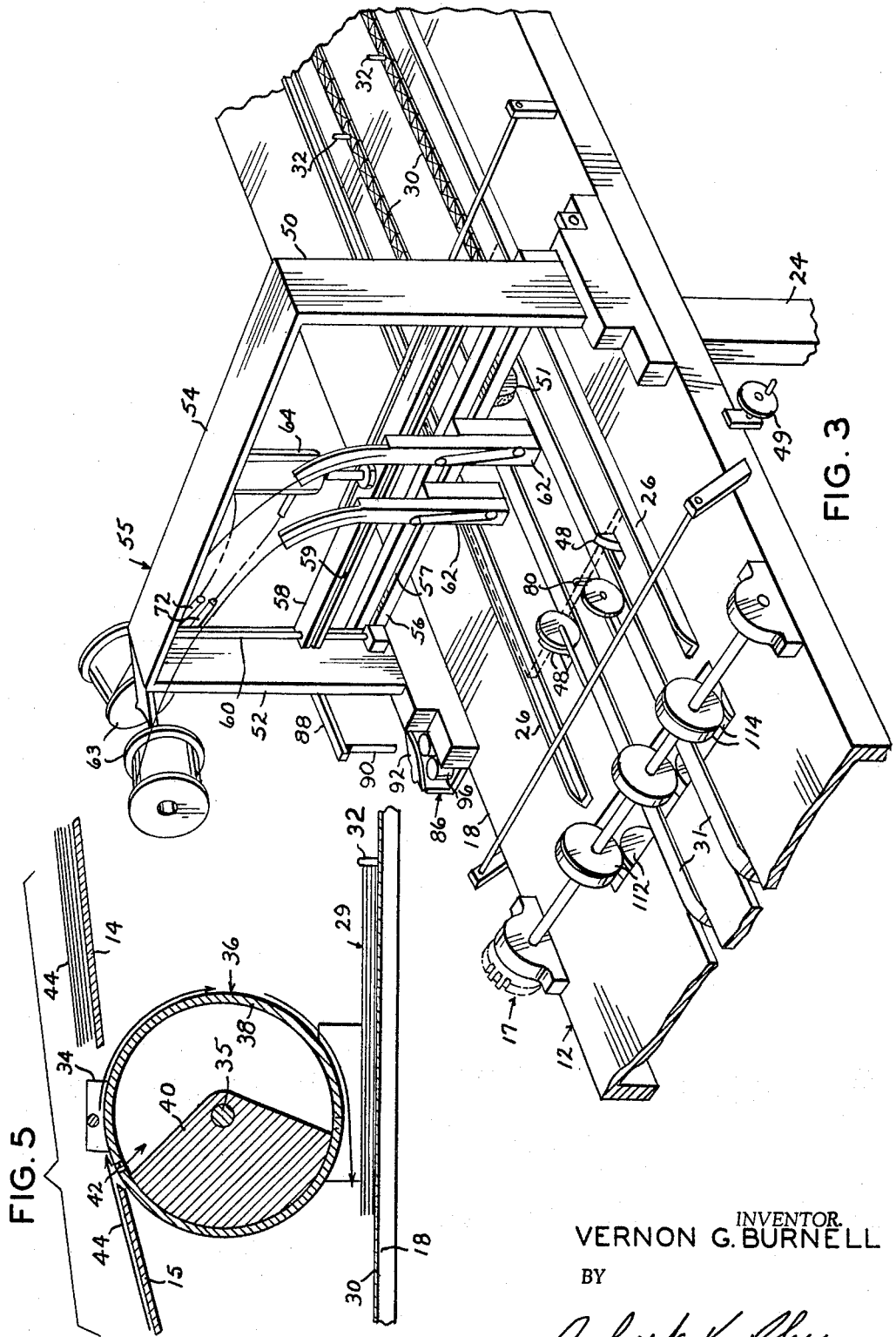

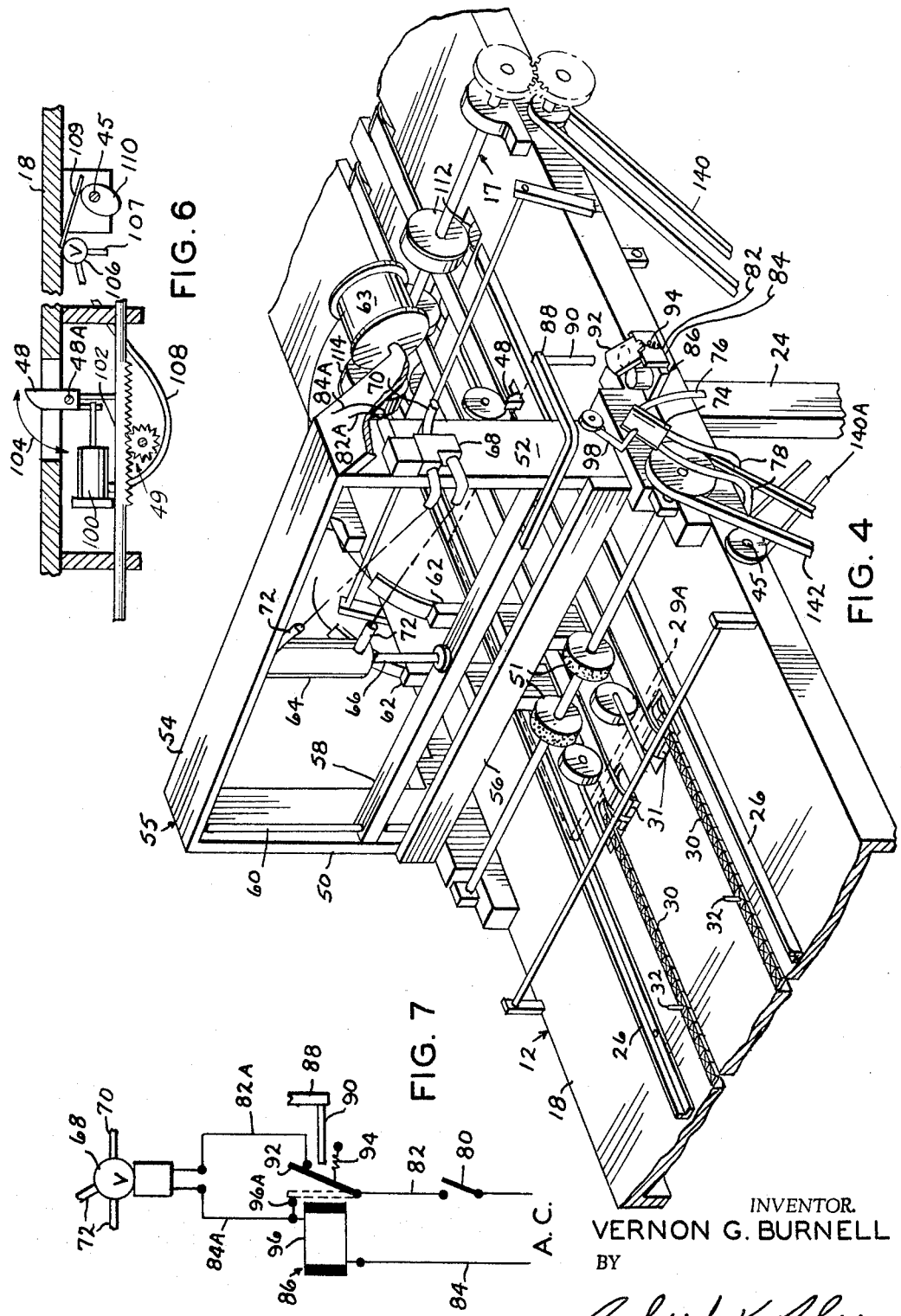

`3,265,274`
PAMPHLET ASSEMBLY AND STAPLING MACHINE
Vernon G. Burnell, Rte. 2, Box 98A, Edmond, Okla.
Filed July 30, 1964, Ser. No. 386,253
6 Claims. (Cl. 227—7)

The present invention relates generally to pamphlet forming machines and more particularly to a machine for assembling and joining together stacked sheets of printed material.

The prior art reveals a number of machines of this class which usually are characterized by conveying means which move the stacked sheets or formed pamphlets along a path which is either curved or turned at right angle to the previous direction of travel in the interest of conserving working space. This type of machine usually causes the stacked sheets or pamphlets to pile up, and become disoriented, thus requiring a stoppage of the machine and an interruption of the pamphlet forming sequence.

One of the principal objects of the invention is to provide a pamphlet assembling and forming machine wherein the material forming the pamphlet is conveyed through the machine in a continuously straight path.

Another important object is to provide an improved mechanism for adding the cover or back of a pamphlet to an assembled stack of sheet material and then joining the material in pamphlet form by stapling.

Another object is to provide a machine of this class which is capable of handling stacked sheet material of various dimensions and thickness.

A further object is to provide a machine having a stapling head capable of adjustment to various spacings between the stapling points and wherein the stapling device is actuated by a pressure cylinder which is in turn controlled by an electric circuit closed by the assembled sheet material.

Another object is to provide a machine of this class which is capable of joining stacks of printed material containing even a relatively few sheets without crumpling or injuring the printed material.

Yet another object is to provide a pamphlet forming machine which receives assembled sheet material, applies a cover to form a pamphlet, staples and trims it then conveys the stapled pamphlet to a folding mechanism.

The present invention accomplishes these and other objects by providing a table-like support having an upper continuous track surface for supporting and conveying the printed material wherein a pamphlet back or cover feeding mechanism adds a cover to each assembly of stacked material to form a pamphlet and positions the pamphlet under a stapling device to be actuated by the assembled pamphlet which is thereafter trimmed and passed through a folding mechanism at the ejection end of the table.

Other objects will be apparent from the following description when taken in conjunction with the accompanying three sheets of drawings, wherein:

FIGURE 1 is a side elevational view of the pamphlet forming machine;

FIGURE 2 is a top plan view of FIG. 1;

FIGURE 3 is a fragmentary perspective view of the table top and stapling device;

FIGURE 4 is a view similar to FIG. 3 illustrating the stapling action controls on the other side of the stapling device;

FIGURE 5 is a vertical cross-sectional view taken substantially along the line 5—5 of FIG. 2;

FIGURE 6 is a fragmentary vertical cross-sectional view, partially in elevation, illustrating the pamphlet stop control;

FIGURE 7 is a wiring diagram of the stapling device control; and,

Like characters of reference designate like parts in those figures of the drawings in which they occur.

In the drawings:

Figure 8:
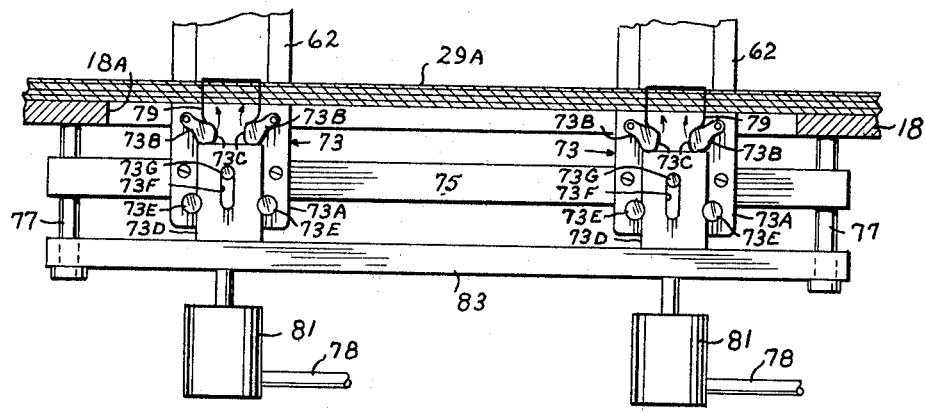
FIGURE 8 is an elevational view, partially in section, of the staple clinching dies.

The reference numeral 10 indicates the device, as a whole, comprising a table-like support 12 having a pamphlet cover feeder device 13, cover supporting platforms or racks 14 and 15, a stapling device 16 and a trimmer 17 mounted thereon. The table 12 includes a rectangular upper surface or support 18 longitudinally aligned with the ejection end of a conventional collator 20. The supporting surface 18 is maintained in parallel spaced relation above a common supporting floor or surface, indicated by the line 22, by a plurality of legs 24.

A pair of parallel guides or rails 26, comprising elongated right angular members, extend longitudinally of the central portion of the upper surface of the support 18 and are adjustable transversely thereof by any suitable means to accommodate the particular width of printed sheets received from the collator 20. A plurality of sheet receiving belts, forming an inclined conveyer 28, receive and transfer printed sheets, indicated by the arrow 29 (FIG. 1), from the collator 20 to the upper surface of the support 18 between the rails 26. Parallel endless conveyer belts or chains 30, extending longitudinally of the table surface 18 between the rails 26, support separate stacks of the printed sheets 29 and progressively move the latter toward the opposite end of the support 18. The conveyer chains 30 are provided with cooperatingly aligned upstanding pins 32 which contact the rearward edges of the stacks of sheet material to hold the sheets in cooperation with the rails 26 in registered position longitudinally and transversely of their direction of travel.

The cover feeder or applying mechanism 13 comprises a pair of upright supports 34 mounted on the table surface 18 at its opposite sides which journals a shaft 35 of a hollow drum 36 having closed ends for rotation about its horizontal axis in spaced relation above the table surface 18. Conventional vacuum operated fingers or suction cups 37, connected by flexible hose 39 and 39A to a vacuum pump 41 through a valve 43, successively transfer, one at a time, covers or pamphlet backs 44 from the rack 14 to the rack 15 in sequence with the rotation of the drum 36. The valve 43 is opened and closed by an arm 47 in sliding contact with a cam 35A mounted on the drum shaft 35. As shown in FIG. 5, the drum 36 comprises an outer circumferential wall 38 which rotates around a fixed position central member 40. A flexible hose 53 connects the drum 36 to the vacuum pump 41. The drum wall 38 is provided with a row of longitudinally spaced apertures 42 so that a reduction of air pressure or suction within the interior of the drum 36 grips the adjacent edge portion of the cover sheet 44 and holds the latter against the periphery of the drum as it rotates in the direction of the arrows. When the apertures 42 are closed by the member 40, the cover 44 is released on top of a stack of the sheets 29 momentarily positioned under the drum 36, as shown in FIG. 5, to form a pamphlet assembly.

The conveyer chains 30 and sheet rear edge contacting means 32 move the assembled pamphlet 29A toward the stapling device 16. The path of the chains 30 terminate adjacent, but to the right of the stapler, as viewed in FIGS. 1 and 2, by being entrained around sprockets on a driven shaft 45. Parallel endless conveyer belts 31, similarly entrained over pulleys on the shaft 45 extend under the stapler 16 toward the ejection end of the table, receive the pamphlet 29A from the chains 30 and transfer it to a stapling position under the stapling means 16. The forward edges, opposite the pins 32, of the sheets forming the pamphlet 29A contact a pair of conventional retractable stops 48. The stops 48 are adjustable longitudinally of the table by a crank and rack means 49 (FIGS. 3 and 6). The stops 48 are adjusted to locate the pamphlet 29A under the stapling means 16 for stapling at a desired position.

Rotating brush rollers 51, mounted above the table surface 18 adjacent the stapling means 16 and normally contacting the conveyer belts 31, cooperate with the latter in urging all of the sheets of the pamphlet, positioned under the stapler, into alignment or registration against the stops 48 prior to the stapling action.

The stapling device 16 comprises a pair of upright supports 50 and 52 connected to opposite sides of the table surface 18 which are joined by an upper transverse cross-member 54 to form a frame 55. A lower cross bar 56 extends between and is rigidly connected at its respective end portions to the base end portion of the uprights 50 and 52 in spaced relation above the table surface 18. One side surface of the cross bar 56 is provided with a longitudinally extending slot or groove 57 for the purposes which will presently be apparent. A second or upper cross bar 58 extends between the supports 50 and 52 above the cross bar 56. The cross bar 58 is slidably connected, at its respective ends, with a pair of vertically disposed rods or guides 60 thus permitting vertical sliding movement of the cross bar 58. The cross bar 58 is similarly provided with a longitudinally extending horizontal groove 59.

The cross bars 56 and 58 support a pair of conventional stapling heads 62. The stapling heads 62 are connected to the grooves 57 and 59 of the cross bars in a conventional manner thus permitting lateral adjustment of the stapling heads relative to the frame 55.

The stapling heads 62 are preferably of the type which forms staples from a roll or reel of wire 63 mounted on the frame 55.

An air pressure operated cylinder 64 is centrally connected at one end to the under surface of the cross-member 54 and has its piston rod 66 centrally connected to the upper surface of the cross bar 58. A magnetic 4-way valve 68, mounted on the staple frame support 52, is connected with a source of air pressure, not shown, by a hose 70 and is in turn connected to the cylinder 64 by hoses 72. The stapling means 16 includes conventional staple clinching dies 73 (FIG. 8) which are actuated by an air valve 74, mounted at the depending end of the table frame support 52. The valve 74 is similarly connected with a source of air pressure by flexible hose 76 and with the clinching dies by hoses 78 for moving the dies into staple clinching position in sequence with the operation of the stapling heads 62 as explained hereinbelow.

When the pamphlet 29A contacts the stops 48 the pamphlet simultaneously contacts the arm of a micro switch 80 to close the switch and complete a circuit from a source of electrical energy, not shown, connected with the magnetic valve 68 by wires 82–82A and 84–84A, through the coil 96 and plate 92 of a relay 86 (FIG. 7). Closing the micro switch 80 actuates the magnetic valve 68 which in turn applies pressure to the cylinder 64 to move its piston rod 66 and the cross bar 58 downwardly to actuate the stapling heads 62 to staple the pamphlet 29A. Simultaneously with this action on arm 88, connected with the bar 58 and extending laterally of and around the staple support 52, moves its vertically disposed depending pin 90 downwardly into contact with and forcibly pivots the relay plate 92 downwardly. The plate 92 is normally held in an upward position away from the coil 96 and in contact with a terminal of the wire 82A (FIG. 7) by a spring 94. When the plate 92 is pivoted downwardly by the rod 90 and is magnetically held by the relay coil 96, the circuit to the magnetic valve 68 is interrupted. De-energizing the valve 68 reverses the action of the cylinder 64 and lifts the staple heads actuating cross bar 58.

The arm 88, during its downward travel, contacts a valve actuating lever 98, connected with the die operating valve 74, to lift the staple clinching dies into contact with the under surface of the pamphlet 29A to clinch the staples.

Referring to FIG. 8, the staple clinching dies 73 are mounted on a horizontal cross bar 75 positioned below the depending surface of the support 18 by vertically disposed support rods 77. The dies 73 are vertically aligned with the respective stapling head 62 through an opening 18A. Each of the dies 73 comprises a plate 73A connected with the cross bar 75. A pair of dogs 73B are pivotally mounted, in horizontal spaced relation, by one end portion to the plate 73A. Each of the dogs 73B have an arcuate surface 73C for contacting and clinching the respective end portion of a staple 79 forced through the pamphlet 29A by the stapling heads 62. A plunger 73D is slidably connected for vertical reciprocating movement to the plate 73A by pins 73E. The upwardly disposed end of the plunger contacts the free end portions of the dogs 73B. A vertically extending central slot 73F limits the vertical movement of the plungers by contact with a pin-like stop 73G connected with the plate 73A.

A pair of air cylinders 81, connected with the hoses 78, vertically reciprocate a horizontal cross bar 83 slidably mounted on the supports 77 to contact and lift the plungers 73D and in turn pivot the dogs 73B into staple clinching position.

The plate 92 is now in contact with a terminal 96A of the coil which maintains the coil 96 energized and prevents a repeat stapling action as long as the micro switch 80 is held closed by the pamphlet 29A.

The stops 48 are released in sequence with the stapling function and travel of the chains 30 and are pivoted downwardly out of pamphlet stopping position by an air cylinder 100 mounted on the rack means 49 below the under surface of support table 18 (FIG. 6). The cylinder 100 is connected with a source of air pressure by a hose 107 and has its piston rod 102 connected with the stops 48 mounted on the shaft 48A, to pivot the stops in the direction shown by the arrows 104 when the cylinder 100 is actuated. The cylinder 100 is connected to the valve 106 by a hose 108. The valve 106 has a control arm 109 bearing against the surface of a cam 110 secured to the pulley supporting shaft 45 to open and close the valve 106 in sequence with the movement of the chains 30. When the stops 48 are pivoted downwardly out of pamphlet stopping position, the belts 31 move the pamphlet 29A to the trimmer 17 and out of contact with the micro switch 80 which opens the latter. When the micro switch 80 is opened, by the stapled pamphlet 29A moving out of contact with the switch 80, the coil 96 is de-energized. This releases the relay plate 92 and permits the spring 94 to return the relay plate 92 to its upper position, thus completing one cycle of the stapling function. Obviously a photocell may be substituted for the micro switch 80 if desired.

The trimmer 17 is conventional and is provided with cooperating upper and lower cutters 112 and 114, which are adjustable transversely of the table 18, for trimming the edges of the pamphlet 29A formerly guided by the rails 26. The guide rails 26 terminate adjacent the trimmer so that the pamphlet 29A, as it leaves the guide rails, is trimmed by the cutters 112 and 114. The conveyor belts 31 then move the trimmed pamphlet 29A to a conventional folding machine 120 which ejects the folded pamphlets to a receiving platform 122.

A motor 124, supported by the table legs 24, is drivably connected to the folding machine 120 by a belt and pulley means 126. A second motor 128 is mounted on a horizontal support 130 connected with the table legs 24 and is drivably connected to the vacuum pump 41 to supply vacuum pull to the vacuum lines or hoses 39A and 53 as described hereinabove. The chains 30 are driven by chain and sprocket means 134 connected with the collator 20 so that the sequence of the operation of the device 10 is in sequence with the action of the collator. As explained hereinabove the chains 30 drive the shaft 45 which in turn drives the belts 31. Other conventional driving means such as chains and sprockets or belt and pulley means 136, 138, 140 and 140A–142, connected with shafts mounted on and under the table top 18 and driven by the chains 30, drive the inclined conveyor 28, cover feeder drum 36, trimmer 17 and rollers 51, respectively.

In operation the device 10 is connected with the collator 20 as explained hereinabove.

A quantity of pamphlet cover stock 44 is positioned on the support 14. The collator 20 is started which continuously drives the conveyer chains 30 at a rate of travel for cooperatively receiving the pamphlet sheets 29 ejected from the collator. The cover feeder 13 is driven by its connection with the conveyer chains 30 through the belt 138 as explained hereinabove.

The fingers 37 lift and transfer the topmost pamphlet cover 44 across the drum and releases this one sheet of cover 44 so that it falls by gravity on the rack 15. In this position the single pamphlet cover sheet 44 has one end portion flatly contacting the surface of the drum 36 as it is being revolved in the direction of the arrows. Vacuum pull, applied by the pump 41 to the drum 36, grips the overlapping edge of the cover sheet 44 against the surface of the drum, by the apertures 42, so that the single sheet of pamphlet cover is carried around the drum 36 and released, when the vacuum pull through the apertures 42 is interrupted by the central member 40, thus permitting the pamphlet cover to fall by gravity on top of a stack of the pamphlet sheets 29. The conveyer chain pins 32 align the cover sheet 44 with the stacked sheets 29 to progressively move and transfer the assembled pamphlet to the belts 31 which in turn positions the pamphlet under the stapling device 16. The belts 31 are continuously moved at the same rate of travel of the conveyer chains 30. When the assembled pamphlet 29A contacts the stops 43, the pamphlet simultaneously contacts the micro switch arm 80 which actuates the magnetic valve 68 to apply air pressure to the cylinder 64 and move the stapling heads 62 into contact with the pamphlet 29A. Simultaneously the valve 74, opened by the downward movement of the arm 88, applies air pressure to the cylinders 81 to actuate the staple clinching dies 73 as explained hereinabove. The stops 43 are released in sequence with the stampling function by the air cylinder 100, as explained hereinabove, so that the stapled pamphlet 29A may be moved by the conveyer belts 31 to the trimmer 17.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A pamphlet assembly and stapling machine, comprising: a table-like support having an elongated horizontal sheet receiving surface; guide means on the sheet receiving surface including a pair of parallel spaced-apart rails for engaging and aligning opposite side edges of a stack of sheet material deposited between said rails; conveyer means on the sheet receiving surface including a pair of chains extending longitudinally of said table-like support in spaced-apart parallel relation, upstanding longitudinally spaced-apart pins secured to each of said chains in aligned relation transversely of said sheet supporting surface for engaging the rearward edges of stacked sheet material and advancing the latter longitudinally of said sheet supporting surface; pamphlet cover feeding means mounted on said table-like support above said sheet receiving surface for adding a pamphlet cover to each stack of sheet material, said cover feeding means including upright supports mounted on opposing side surfaces of said table-like support, a hollow drum journaled by said upright supports for rotation about a horizontal axis, said drum having spaced apertures in its wall, air pressure reducing means connected with the interior of said drum, a pamphlet cover holding rack positioned adjacent said drum so that an edge portion of a pamphlet cover when placed on said said drum overlies a portion of the periphery of said drum; pamphlet stapling means mounted on said table-like support; belt conveyer means for positioning each stack of sheet material under said stapling means; and control means actuated by said positioned stack of sheet material for operating said stapling means.

2. Structure as specified in claim 1 in which said pamphlet stapling means includes: a frame connected with and straddling said table-like support; a lower cross bar extending between and fixed to said frame; at least one staple head adjustably connected with said lower cross bar; an upper vertically movable cross bar connected with said staple head; and an air pressure operated cylinder connected with said frame, said cylinder having a piston connected with said upper cross bar for reciprocating the latter and operating said staple head.

3. Structure as specified in claim 1 in which said belt conveyer means includes: a pair of laterally spaced belts cooperatively aligned with said pair of chains for receiving said stacked sheet material from said chains and moving said stacked sheet material under said stapling means; at least one rotating roller mounted on said table-like support in alignment with and cooperating with one said conveyor belt in frictionally urging the sheets of said stack of sheet material toward said stapling means; and retractable stops projecting upwardly from the horizontal plane of said sheet receiving surface for interrupting the travel of said stack of sheet material.

4. Structure as specified in claim 1 in which said control means includes: a magnetic valve connecting a source of air under pressure to said air pressure operated cylinder; a relay mounted on said staple head frame, said relay having a coil and having a plate movable toward and away from said coil; a spring normally holding said plate out of contact with said coil; normally open switch means mounted on said table-like support in the path of travel of and closed by said stack of sheet material; wiring connected with a source of electrical energy and connecting said switch means to said magnetic valve through said relay to complete a circuit through the latter when said switch means is closed; and means for interrupting the circuit to said magnetic valve.

5. A pamphlet assembly and stapling machine, comprising: a table-like support having an elongated horizontal sheet receiving surface; guide means on the sheet receiving surface including a pair of parallel spaced-apart rails for engaging and aligning opposite side edges of a stack of sheet material deposited between said rails; conveyer means on the sheet receiving surface including a pair of chains extending longitudinally of said table-like support in spaced-apart parallel relation, upstanding longitudinally spaced-apart pins secured to each of said chains in aligned relation transversely of said sheet supporting surface for engaging the rearward edges of stacked sheet material and advancing the latter longitudinally of said sheet supporting surface; pamphlet cover feeding means mounted on said table-like support above said sheet receiving surface for adding a pamphlet cover to each stack of sheet material, said cover feeding means including upright supports mounted on opposing side surfaces of said table-like support, a hollow drum journaled by said upright supports for rotation about a horizontal axis, said drum having spaced apertures in its wall, air pressure reducing means connected with the interior of said drum, a pamphlet cover holding rack positioned adjacent said drum so that an edge portion of a pamphlet cover when placed on said drum overlies a portion of the periphery of said drum; pamphlet stapling means mounted on said table-like support, said pamphlet stapling means including, a frame connected with and straddling said table-like support, a lower cross bar extending between and fixed to said frame, at least one staple head adjustably connected with said lower cross bar, an upper vertically movable cross bar connected with said staple head, and an air pressure operated cylinder connected with said frame, said cylinder having a piston connected with said upper cross bar for reciprocating the latter and operating said staple head; belt conveyer means for positioning each stack of sheet material under said stapling means, said belt conveyer means including, a pair of laterally spaced belts cooperatively aligned with said pair of chains for receiving said stacked material from said chains and moving said stacked sheet material under said stapling means, at least one rotating roller mounted on said table-like support in alignment with and cooperating with one said conveyer belt in frictionally urging the sheets of said stack of sheet material toward said stapling means, and retractable stops projecting upwardly from the horizontal plane of said sheet receiving surface for interrupting the travel of said stack of sheet material; and control means actuated by said positioned stack of sheet material for operating said stapling means, said control means including, a magnetic valve connecting a source of air under pressure to said air pressure operated cylinder, a relay mounted on said staple head frame, said relay having a coil and having a plate movable toward and away from said coil, a spring normally holding said plate out of contact with said coil, normally open switch means mounted on said table-like support in the path of travel of and closed by said stack of sheet material, wiring connected with a source of electrical energy and connecting said switch means to said magnetic valve through said relay to complete a circuit through the latter when said switch means is closed, and means for interrupting the circuit to said magnetic valve.

6. Structure as specified in claim 5 in which the last mentioned means includes a depending pin connected with said upper cross bar, said depending pin forcibly moving said relay plate toward said relay coil in response to downward movement of said upper cross bar to complete an electrical circuit through said plate to said coil and maintain the coil energized while said switch means remains closed.

References Cited by the Examiner
UNITED STATES PATENTS

| | | | |
|---|---|---|---|
| 1,738,586 | 12/1929 | Kleinschmit | 227—103 X |
| 2,995,755 | 8/1961 | Hines | 227—103 X |

GRANVILLE Y. CUSTER, Jr., *Primary Examiner.*